Oct. 5, 1971 J. A. CACHEUX 3,609,992
HERMETICALLY SEALED BOX FOR MAINTAINING A SEMICONDUCTOR RADIATION DETECTOR AT A VERY LOW TEMPERATURE
Filed Aug. 12, 1969
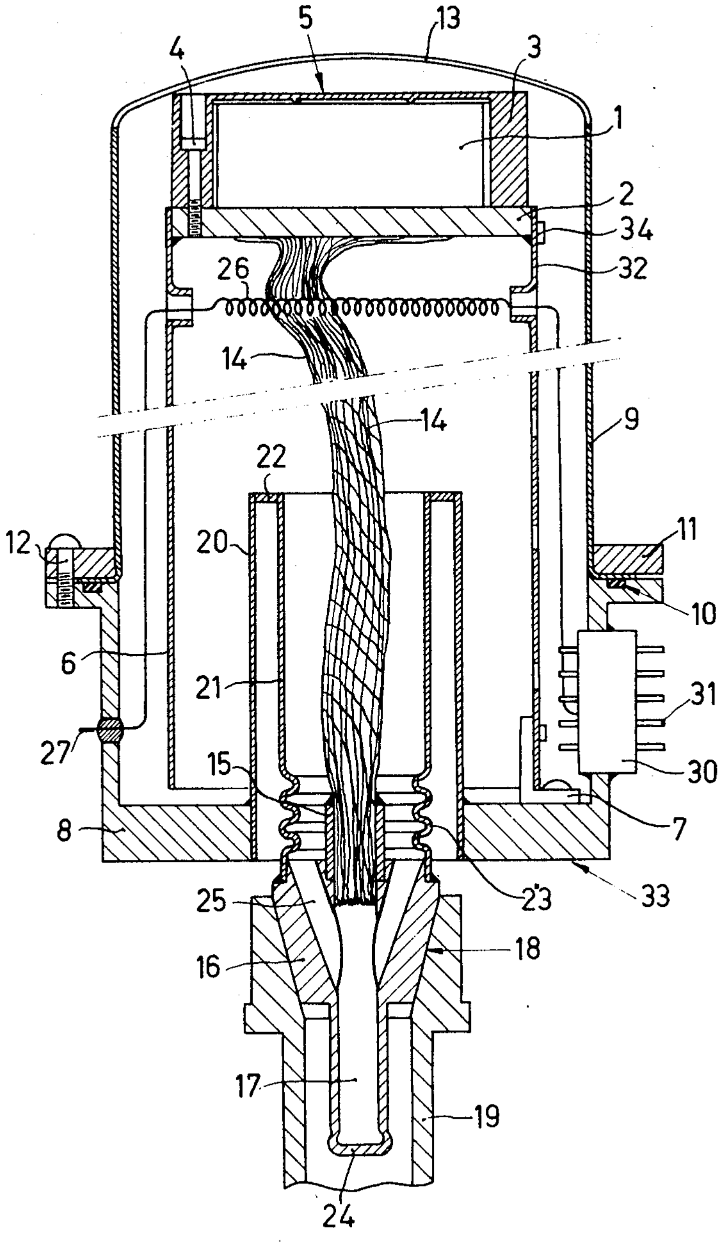
INVENTOR.
JEAN A. CACHEUX
BY
AGENT United States Patent Office 3,609,992

Patented Oct. 5, 1971

3,609,992

HERMETICALLY SEALED BOX FOR MAINTAINING A SEMICONDUCTOR RADIATION DETECTOR AT A VERY LOW TEMPERATURE

Jean Antoine Cacheux, Caen, France, assignor to U.S. Philips Corporation

Filed Aug. 12, 1969, Ser. No. 849,447
Int. Cl. F25b *19/00*
U.S. Cl. 62—514 11 Claims

ABSTRACT OF THE DISCLOSURE

Hermetically closed box for accommodating a semiconductor device, such as a radiation detector which is maintained in a vacuum and at low temperature by connection to a cryostat by a flexible cold conductor, with additional means in the box for improving the vacuum.

This invention relates to a sealed box for accommodating in vacuum a semiconductor device, particularly a radiation detector of germanium or lithium-compensated silicon, which box serves for maintaining said device at a very low temperature in connection with the cold source of a cryostat.

Some semiconductor devices have to be employed and maintained in vacuum at very low temperature both for use and for storage. For this purpose it is known to enclose them in vacuum in a sealed box, the volume of which is only slightly larger than that of the device and the wall of which is traversed by at least one insulated connection. Thus so-called encapsulated detectors are obtained; the box is disposed in a cryostat comprising a coolant source and a cold conduit leading to the device.

This arrangement has numerous inconveniences, in a radiation detector two absorbing metal walls are superimposed in the trajectory of the incident radiation, which walls form the inlet window of said detector. Moreover, since the box does not comprise pumping means, prior to the vacuum-tight closure, both the box and the device therein must be subjected to a thermal desorption treatment, in order to avoid trapping gases particularly in the walls; and such thermal treatment usually affects the device adversely.

In order to improve the thermal efficiency a different mounting method is used, which consists in placing the device without a box in a cryostatic space in connection with pumping means capable of providing high vacuum and comprising a cold conduit communicating with a coolant reservoir. In this case the device is fixed to the end of said conduit and held thereby. In this arrangement the vacuum space of the device is united with that insulating the cryostat. In the case of a detector this arrangement has a minimum thickness of the inlet window, but the device is thus mounted in a definite position, while it is neither accessible nor exchangeable. Prior to the final mounting operation it is not possible to carry out a test either to carry out a subsequent thermal treatment or to recondition a detector by a so-called "clean-up" operation; a defect of the detector necessitates dismounting of the whole cryogenic assembly. Moreover, in the case of large-volume detectors which are gradually used more frequently and becoming more desirable, the weight of the detector is very high so that the supporting cold conduit of the cryostat, which conduit itself is usually held in place by assemblies of long, thin tubes of minimum thermal conductivity, is exposed to excessive forces; the position of the detector is not accurately defined with respect to the plane of fastening of the cryostat.

The invention has for its object to combine the possibilities and advantages of encapsulation of a device and of mounting in a cryostat, while the disadvantages of either method are mitigated. In order to avoid the disadvantage of heating a device prior to evacuation, the box has to comprise pumping means for improving the vacuum or at least maintaining it at a high level. On the other hand the independence of the device of the cryostat feeding the coolant requires a movable thermal contact between the device and the cold conduit of the cryostat, while the exchangeability of several devices involves the necessity of providing a movable contact which is adjustable to various cryostats.

According to the invention the sealed box accommodates in vacuum a semiconductor device, particularly a radiation detector of lithium-compensated germanium or silicon, which box serves to maintain the device at a very low temperature in connection with the coolant source of a cryostat. The box includes means for improving and maintaining the vacuum and, as the case may be, electronic elements associated with the device, which is connected (a) on the one hand to the cryostat by a flexible conductor traversing the wall of the box through a conductive passage thermally and mechanically insulated, the outer end of the conductor being provided with a connecting piece adjustable to the cold conduit of the cryostat, and (b) on the other hand supported by a tube surrounding said conductor and thermally and electrically insulated from the box.

The box according to the invention is adjustable to the various types of cryostats. Finding a defect in the device does not require the complete dismounting of the cryogenic assembly; it is possible to carry out tests of the device on a cryostat or even on a simple Dewar vessel prior to the final mounting on a cryostat without the need for mounting a complete cryogenic assembly. It is not necessary to heat the device prior to or after mounting, since the vacuum is improved by the means included in the box. The device can be tested, and the electronic assembly of the device and its associated elements can be adjusted from the outer side of the associated cryostat. The box may be directly mounted in an accelerator cavity with an arbitrary coolant conveying means, even without protection.

On the other hand the incident radiation has to traverse only one metal wall; the detector is at a distance from the important metallic masses of the cryostat or from the base of the box, which masses might give rise to retransmission.

The detector included in the box according to the invention many have a very large volume and its weight is held by an element not connected with the cold circuitry, which element may be sufficiently rigid to resist bending and to ensure a fixed position of the detector relative to any reference plane.

The thermal leakage of this box is of the order of the conventional cryostat assemblies and the consumption of cryogenic fluid is very low.

In a preferred embodiment of the new box the means for improving and maintaining the vacuum in the box are formed by a filament of titanium or other refractory metal to be evaporated, and the electronic elements associated with the device are included in the box particularly in the form of discrete components and thin layer deposits on an insulating substrate.

This embodiment has the advantage of providing the possibility of setting the assembly of the detector and its electronic elements independently of the cryostat in a very satisfactory vacuum, which is easily obtained after a primary pumping operation and sealing of the box owing to a few rapid evaporation cycles of titanium. The test can be carried out very rapidly, which is particularly advantageous in the case in which the thermal connection between the detector and the cryostat coolant source has a high inertia.

In a further embodiment the connecting piece adjustable to the cold conduit of a cryostat is formed by a conical connector, the expansion coefficients of the fitting parts thereof being chosen so that a tight contact of the surfaces is ensured during cooling.

The invention will be described more fully with reference to the accompanying drawing, wherein the sole figure is a sectional view of a box including a lithium-compensated germanium detector. The detector is designated by 1. It is applied as usual to a plate 2 with a lid 3 connected by screws 4. This lid usually consists of thermo-hardening material having a slight elasticity and being electrically insulating and composed of elements of low atomic mass so that it does not absorb radiation and does not give rise to retransmission. The surface of incidence of the detector is the face 5 opposite the plate 2.

The plate 2, preferably of aluminium, is fastened to a tube 6 having a thin wall and supported by hooks 7 of insulating, elastic material, for example, polytetrafluoroethylene and fixed to the base of the box 8. A cap 9 covers the base 8, to which it is fastened by a hermetic joint 10, for example of indium, clamped tight by a collar 11 and screws 12. The cap 9 has a minimum thickness at the surface 13, which forms the inlet window of the device. This surface 13 is preferably convex so that it may have the minimum thickness still compatible with the pressure differences to be resisted, with the minimum distance between detector and window and the permissible flexure. It is also possible to use such a surface if it has to be made of a material differing from that of the cap; for example, it may be made of beryllium and be welded to the cap.

The cold circuitry of the box comprises from the plate 2 a braided metal wire 14, preferably of aluminium, welded or compression-bonded on the one hand to the plate 2 and on the other hand to the tubular end 15 of a flange 16, terminated otherwise by a further tubular piece 17, preferably of copper. The flange 16 has a projecting conical part 18 co-operating with the re-entrant conical part of a piece 19 forming the end of the cold conduit of a cryostat (not shown).

The flange 16 is connected with the base 8 by a soldered, air-tight assembly of two coaxial tubes 20 and 21 and a washer 22, the tube 21 having an undulated bellows part 23, which provides a given freedom of movement of the flange 16 with respect to the box. The tubes 20 and 21 have a small diameter and a great length and are made of a material of low thermal conductivity, for example, stainless steel of a thickness of 0.2 mm.

The space enclosed by the cap 9 and the base 8 can be connected with primary pumping means through passages 25 in the flange 16 and through the tube 17 operating as an exhaust tube. When a vacuum of the order of $10^{-4}$ torr is attained in the space, the tube 17 is closed at 24 by pinching. The vacuum is then improved to $10^{-6}$ or $10^{-7}$ torr, for instance, by evaporation and getter effect obtained by evaporating a filament 26, held between insulated terminals 27 and traversing the tube 6 without being in contact herewith. In order to ensure an equivalent pumping rate for different gases, it is advantageous to provide one or more complex filaments of tungsten, molybdenum and titanium. The filaments can be excited in the course of time in order to compensate any decrease of vacuum.

In order to improve the thermal insulation between the detector and the base and to improve the pumping rate, the tube 6 is perforated at a plurality of places. The number and the size of the perforations decrease towards the plate 2 and the part 32 is not perforated in order to maintain the getter effect throughout the surface and to avoid deposits on the detector or the inlet window.

The inner volume of the tube 6 is sufficient for accommodating the electronic elements associated with the detector 1, not only the field-effect transistor usually included in the preamplifying circuit capable of operating at a very low temperature, but also other electronic components which may be provided either in the form of thin layers or by the so-called tongue-circuit technique. The field-effect transistor may be connected with a glass substrate fixed at 34 to the tube 32.

The detector 1 and the electronic components of the amplifying circuit included in the space are connected to each other by wires (not shown in the drawing) and to the external device via a terminal 30 by means of various insulated pins 31.

The box described above may be used on a cryostat; the base 8 is connected by its face 33 with a bracket of this cryostat with the interposition of a dismountable sealing joint, for example of indium, while the flange 16 co-operates with the end of the cold conduit of said cryostat. If necessary an intermediate adapting piece is positioned between the base and the bracket. For tests or measurements to be carried out when not used on a cryostat, the box may be simply connected with a cooling fluid reservoir by means of a dipping rod extending into the piece 19. This box also may be employed particularly advantageously when mounted on a cryostat of the type disclosed in applicant's French Pat. No. 1,569,965 entitled "Cryostat, particularly for semiconductor detectors."

In this case the thermal leakages due to the box and to the detector are, for example, of the order of 0.40 w. inclusive of the electronic elements of the amplifying circuit, which corresponds to a consumption of the cryostat of 0.6 litre of liquid nitrogen a day. The achievements of a detector enclosed in a box according to the invention are superior to those of a detector mounted in a conventional manner. Particularly because the detector is supported by a tube independent of the cold conduit and connected to the box through hooks of polytetrafluoroethylene or an equivalent material, the transmission of high-frequency vibrations to the detector are avoided, which vibrations adversely affect the detector while the microphonic noise due to the boiling cryogenic liquid or due to the contact of the thermo-electric elements in the earth connection is suppressed. As a matter of course, the embodiments described above may be modified within the scope of this invention by using other equivalent technical means.

What is claimed is:

1. Apparatus for housing and cooling a device such as semiconductor radiation detector, the apparatus operable in connection with a cryostat cold source and a vacuum pumping means, and comprising, a hermetically-sealed outer housing, a thermally conductive mounting plate on which the device is securable, the plate being secured to the housing interior but thermally insulated therefrom, a flexible tubular connector traversing a wall of the housing for communicating the vacuum pumping means to the housing interior, a flexible, thermal conductor having one end attached to said plate, and the other end extending through the tubular connector to said cold source, and means within the housing for improving the vacuum therein, independent of said vacuum pumping means.

2. Apparatus for housing and cooling a device such as semiconductor radiation detector, the apparatus operable in connection with a cryostat cold source, an electric power source, and a vacuum pumping means, and comprising, a hermetically-sealed outer housing, a thermally conductive mounting plate on which the device is securable, the plate being secured to the housing interior but thermally insulated therefrom, a flexible tubular connector traversing a wall of the housing for communicating the vacuum pumping means to the housing interior, a flexible metallic braid thermal conductor having one end attached to said plate, and the other end extending through the tubular connector to said cold source, and a refractory metal filament within the housing for improving the vacuum therein, independent of said vacuum pumping means, and means connecting said source of electric power to the filament for flowing current therethrough and evaporating same, and thus improving the vacuum via the getter effect.

3. Apparatus according to claim 1 operable with an electric power source wherein said means for improving the vacuum comprises a filament of refractory metal mounted in the housing interior, and means connecting said source of electric power to the filament for flowing current therethrough and evaporating said filament, and thus improving the vacuum in the housing via the getter effect.

4. Apparatus according to claim 3 wherein said metal comprises a combination of titanium, molybdenum, and tungsten.

5. Apparatus according to claim 1 wherein said device includes associated circuitry formed in thin-layer deposits on an insulating substrate secured to the means for supporting the device.

6. Apparatus according to claim 1 wherein said connector comprises a thin-walled tube of low thermal conductivity having one end secured to the housing and the other end adapted to be axially extendible.

7. Apparatus according to claim 6 wherein the connector includes a pair of cooperating conical-shaped terminal elements of low co-efficient of expansion for connection to the vacuum pumping means.

8. Apparatus according to claim 1 further comprising a thin-walled tube having two ends, the mounting plate secured to one end, and the other end secured to the base with non-conductive polytetrafluoroethylene material.

9. Apparatus according to claim 1 wherein said housing has a window part that is convex on its external surface, and the device is situated adjacent this window.

10. Apparatus according to claim 1 wherein the housing comprises a base part and a cap part, and hermetically-sealing joint formed of indium.

11. Apparatus according to claim 3 wherein the flexible thermal conductor comprises a braided aluminum wire.

References Cited

UNITED STATES PATENTS

| | | | |
|---|---|---|---|
| 2,951,944 | 9/1960 | Fong | 62—514 |
| 3,006,157 | 10/1961 | Haettinger et al. | 62—514 X |
| 3,064,451 | 11/1962 | Skinner | 62—514 |
| 3,066,222 | 11/1962 | Poorman et al. | 62—514 X |

JOHN W. HUCKERT, Primary Examiner

A. J. JAMES, Assistant Examiner

U.S. Cl. X.R.

317—234 R, 234 A, 234 B, 234 C; 307—245; 250—83.3; 62—268